United States Patent Office 3,487,041
Patented Dec. 30, 1969

3,487,041
SOLID STATE DYEING OF POLYESTERS
Yuzi Okuzumi, Akron, Ohio, assignor to The Goodyear Tire & Rubber Company, Akron, Ohio, a corporation of Ohio
No Drawing. Filed Dec. 29, 1967, Ser. No. 694,386
Int. Cl. C08g 53/04
U.S. Cl. 260—40                                                12 Claims

ABSTRACT OF THE DISCLOSURE

This invention relates to a method for coloring polyester resins by mixing substantially amorphous polyester resin in solid form with soluble heat stable coloring matter in solid form under controlled conditions.

---

This invention relates to an improved method for coloring polyester resins and to the production of colored filaments, films and fibers.

Polyester resins are useful for the production of films and textiles but since they do not readily absorb aqueous liquids and have poor affinity for coloring matter, considerable difficulties are experienced in satisfactorily coloring the resins to permit the production of films, fibers and filaments that contain coloring matter uniformly distributed to obtain depth of shade. A method commonly used to obtain colored polyester is to disperse insoluble pigments or coloring matter into the polyester. However, in this process the pigment is often not uniformly distributed in the resulting films and fibers. Generally, deep shades are obtained in polyesters by dyeing with dispersed coloring matters using expensive carriers or by using the thermosol process. The use of carriers is undesirable because they are uneconomical, difficult to remove, and may plasticize or soften the resultant films, fibers and filaments. It has been proposed that polyester resins such as polyethylene terphthalate can be colored by mixing the resin with organic coloring matter at elevated temperatures. However, this method is not entirely satisfactory.

It is an object of this invention to provide an improved method for coloring polyester resin. It is another object of this invention to produce a colored polyester resin and colored products therefrom. Other objects will appear hereinafter as the description of the invention proceeds.

According to the invention, it has been found that crystallizable polyester resins containing more than 67% of amorphous structure can be colored efficiently by treating solid particles of the amorphous polyester resin with particular organic coloring materials at a temperature between the second order transition temperature of the resin and the crystallization temperature of the resin for a period of time sufficient for the coloring material to be absorbed by the resin, but which is less than the period of time required to reduce the content of amorphous structure to less than 67%. According to the invention, temperature and time of mixing are controlled within these limits to effectively accomplish the coloring of the polyester. Thus, if the temperature of mixing is below the glass transition temperature of the polyester, the coloring matter is not readily absorbed by the polyester resin. On the other hand, if the temperature at which the resin is treated is too high, the amorphous regions in the polyester crystallize resulting in slowing of the absorption of the coloring matter or actual discharge of coloring material already absorbed.

The polyesters which respond to this treatment are crystallizable linear polyester resins. They may be derived from glycols and dicarboxylic acids or ester-forming derivatives thereof by ester interchange and condensation reactions or by other known methods. In preparing the polyester resins, the reactants are treated under stringent conditions of elevated temperature and reduced pressure. The synthetic linear polyesters particularly suited for the production of filaments, fibers and films have an intrinsic viscosity of at least 0.3, a low degree of solubility in organic solvents and the property of being capable, when formed into filaments, of being drawn to form useful textile fibers. Generally, the polyester resin is rapidly quenched from the molten state when it is first prepared so that a very high degree of amorphous structure exists in the resin. The slower the quenching, the more crystallized the polymer will be. Crystallizable polyesters, predominantly in the amorphous state, preferably in the form of chips or particles, are colored by the process of this invention.

To provide an understanding of the terms used in this specification, an explanation by way of definitions is included with the intent that, wherever the terms appear, they are to be construed in accordance with such definitions.

Intrinsic viscosity is defined as limit $\ln(\eta_r)/C$ as approaches zero in which $\eta_r$ is the viscosity of a dilute solution of the resin in a 60/40 phenol tetrachloroethane solvent mixture divided by the viscosity of the solvent mixture in the same units at the same temperature. A sufficient sample of resin is dissolved in the solvent mixture to form a solution having a resin concentration of approximately 0.4 gram per 100 centimeters of solution. The time of flow of each solution and of the solvent is measured in a No. 1 Ubbelohde Viscosimeter at 30° C. and these times are used in the respective viscosities in the equation above.

Glass transition temperature or second order transition temperature ($Tg$) is defined as the temperature at which a discontinuity occurs in the curve of a first derivative thermodynamic quantity with temperature. It is correlated with yield temperature and polymer fluidity and can be observed from a plot of density, specific volume, specific heat, sonic modulus or index of refraction against temperature. The glass temperature of the polyester resin is characterized by a change from a relatively hard, brittle, glassy material to a soft, more flexible, rubbery substance as the temperature is raised through the glass transition temperature $Tg$. The glass transition temperature varies somewhat with the nature of the glycol and the dibasic acid reacted together to form the polyester.

Crystallization temperature ($Tm$) of this invention is defined as the temperature at which the percent crystallinity induced in the originally amorphous polymer is 33% after a period of time equal to ten times one-half the time required for the polyester to attain its substantially limiting density. The crystallization temperature specifically defined for this invention is that temperature above the glass transition temperature at which the degree of crystallinity induced in the resin does not reach more than 33% after mixing with coloring matter for a period sufficient to color the resin. For polyethylene terephthalate a density of 1.374 is equivalent to 33% crystallinity based on completely amorphous polyethylene terephthalate having a density of 1.331 and completely crystalline polyethylene terephthalate having a density of 1.470.

When polyethylene terephthalate is heated at constant temperature above 90° C., the amorphous region in polyester resin begins to crystallize as evidenced by an increase in density after a short induction period. The density increases until it reaches an equilibrium or steady state with very slight increases thereafter. This is referred to here as the substantially limiting density. The time required for the density to first reach this plateau is twice the half time referred to in the definition of crystallization temperature. Ten half times would therefore be merely ten times this half time value. The half-time concept is discussed in "Crystallization of Polyethylene Terephthalate" by W. H. Cobbs and R. L. Burton in Journal of Polymer Science, vol. X, No. 3, pages 275–290.

A half time is therefore defined as half the time required for the density to reach a maximum or essentially a maximum on a curve of density versus time at a given temperature. Some examples of this are shown below:

CRYSTALLIZATION OF POLYETHYLENE TEREPHTHALATE

| Temperature, °C. | Half time, seconds | Induction time, seconds |
|---|---|---|
| 120 | 859 | 233 |
|  | 938 | 203 |
| 130 | 266 | 138 |
|  | 302 | 72 |
| 140 | 192 | 55 |
|  | 168 | 47 |
| 150 | 107 | 30 |
|  | 115 | 42 |
|  | 124 | 46 |
| 160 | 73 | 23 |
|  | 76 | 24 |
|  | 76 |  |

The following density data were obtained after treating copolyesters of ethylene terephthalate/ethylene isophthalate in the form of chips for 24 hours at the indicated temperature.

|  | Density at 30° C. | | |
|---|---|---|---|
| Terephthalate/Isophthalate Content | 100/0 | 98/2 | 90/10 |
| Treating Temperature: | | | |
| 120° C | 1.375 | 1.380 | 1.380 |
| 140° C | 1.377 | 1.384 | 1.384 |
| 170° C | 1.379 | 1.395 | 1.393 |
| 200° C | 1.383 | 1.401 | 1.398 |

The above density values are approximately the maximum density and can be used in the calculation of maximum crystallinity.

The percent crystallinity at ten half times is determined from the inverse of the density at ten half times which is equivalent to the specific volume at ten half times. According to this formula:

$$\alpha = \frac{Va - V}{Va - V_k} \times 100$$

where $\alpha$ = percent crystallinity after ten half times
$Va$ = specific volume of the polymer substantially all amorphous in structure
$V_k$ = specific volume of the polymer substantially all crystalline in structure
$V$ = specific volume of the polymer whose crystallinity is to be calculated after ten half times The density of polyethylene terephthalate at ten half times can thereby be calculated using the above formula as illustrated below:

$$\alpha = \frac{Va - V}{Va - V_k} \times 100$$

$$33 = \frac{\frac{1}{1.331} - V}{\frac{1}{1.331} - \frac{1}{1.47}} \times 100$$

$$V = .7279$$

$$\text{Density} = D = \frac{1}{V} = \frac{1}{0.7279} = 1.374 \text{ (after ten half times)}$$

To illustrate, the determination of the crystallization temperature from the density of polyethylene terephthalate after ten half times, consider the following data on polyethylene terephthalate showing density at 30° C. as measured in a density gradient tube:

LIMITING DENSITY OF POLYETHYLENE TEREPHTHALATE AFTER 10 HALF-TIMES

| p(amorphous) = 1.331 | | p(X-ray) = 1.47 | |
|---|---|---|---|
| Temperature, °C. | Density | Temperature, °C. | Density |
| 120 | 1.375 | 190 | 1.381 |
| 130 | 1.374 | 200 | 1.383 |
| 140 | 1.377 | 210 | 1.384 |
| 150 | 1.378 | 220 | 1.405 |
| 160 | 1.378 | 230 | 1.408 |
| 170 | 1.379 | 240 | 1.415 |
| 180 | 1.380 | | |

Therefore, from the above table, the crystallization temperature would be the temperature at which polyethylene terephthalate reaches a density of 1.374 after ten half times and this would be a temperature of about 130° C.

It was found that highly crystalline polyester resins when mixed with powdered soluble organic coloring material of the class known as anthraquinone dyes at a temperature between the glass transition temperature of the resin and its crystallization temperature do not absorb the coloring material as much as polyester resins of low crystalline structure. When substantially amorphous polyester resin was mixed with the same powdered soluble organic coloring material at temperatures below the glass transition temperature of the resin, poor absorption of the coloring matter in the same period of time was obtained. However, when substantially amorphous polyester resins were mixed with coloring materials of this invention at a temperature between the glass transition temperature of the resin and its crystallization temperature, the coloring material was absorbed completely.

Thus, according to the invention these soluble coloring matters penetrate homogeneously into the polyester at a rapid rate at the temperature between the glass transition temperature and the crystallization temperature of the polyester being colored for a period of time less than the period required for crystallization to reduce the amorphous content to less than 67%.

The particular coloring matter used in the invention represents the general classification which may be designated as anthraquinone dyes which do not contain water-solubilizing substituent groups such as sulfonic or carboxylic acid radicals. Specific examples include 1-cyclohexylamino anthraquinone, 1-methylamino 4-p-toluidino anthraquinone, 1,4-p-toluidino anthraquinone, 1,4-p-toluidino-5-hydroxy anthraquinone, 1-p-toluidino 4-hydroxy anthraquinone, 1,4-dibutylamino anthraquinone, 1,4-cyclohexylamino anthraquinone, 1-amino-2-methyl-4-p-toluidino anthroquinone, 1,8-p-toluidino anthraquinone, 1,5-p-toluidino anthraquinone, and fluorol green.

The invention is illustrated by the following examples:

Polyethylene terephthalate chips with less than 33% crystalline structure having an intrinsic viscosity of 0.62 were placed in a two liter one neck flask and 1-methylamino 4-p-toluidino anthraquinone dye was added. The flask was slowly rotated on a glycol bath at 130° C. The polyethylene terephthlate chips and coloring matter were tumbled and mixed for 10 minutes after which little or no coloring matter remained on the flask. The polyethylene terephthalate chips were removed from the flask. They were formed into fibers by melt extrusion. The fibers were a deep blue color.

The above test was repeated mixing the material at 130° C. for one hour. At the end of this period the flask had built up a coating of coloring matter. The polyethylene terephthalate chips were removed and formed into fibers by melt extrusion. The fibers were a much lighter shade of color than fibers made from the resin.

The above tests show that when polyethylene terephthalate containing more than 33% crystallinity was mixed with coloring matter of the type indicated herein at temperatures in excess of 110° C. for periods longer than one hour, the penetration of coloring matter into the polymer is actually reduced because of increasing crystallization. The polyethylene terephthalate resin will actually discard coloring matter on its surface as crystallization increases. Therefore, at temperatures above 110° C. the coloring period must be closely controlled so the mixing treatment is completed before the degree of crystallization has exceeded 33%. At temperatures of about 130° C. this degree of crystallization is attained in about 15 or 20 minutes and mixing should be completed in a period of from about 5 to about 10 minutes. Prolonged mixing at this temperature or a higher temperature results in absorption of less of coloring matter and very light shade of color in fibers made from the resin. The preferred temperature range for carrying out the process of this invention on polyethylene terephthalate chips is 85° C. to 110° C. This provides a mixing period that is reasonably adaptable to plant operations. It should be remembered that coloring at higher temperatures than 130° C. is not practical because of the extremely short period required to reach 33% crystallinity.

To further illustrate the invention, 1,4-p-toluidino anthraquinone blue-green coloring matter amounting to 0.5% by weight was mixed with amorphous polyethylene terephthalate and crystalline polyethylene terephthalate at 80° C. Crystalline poyethylene terephthalate was obtained by drying or tumbling amorphous polyethylene terephthalate at 240° C. for 24 hours. Both the amorphous sample and the crystalline sample were mixed with the dye for 50 minutes. The resultant chips as well as the spun fabric differed greatly in depth of shade of blue-green color. The amorphous sample was much darker. Coloring matter deposited on the flask during tumbling of the crystalline polyethylene terephthalate and coloring matter settled beneath the chips of the crystalline sample on standing while none of this occurred with the amorphous sample.

Polyethylene terephthalate was mixed with 1,4-bis-cyclohexylamino anthraquinone coloring matter amounting to 0.5% by weight at 150° C. for 2 hours and compared with 150° C. for 5 minutes. Again the sample mixed at 150° C. for 5 minutes resulted in a much deeper shade of blue color after spinning than the sample mixed at 150° C. for 2 hours. The crystallinity of each sample was determined and found to be 23% in the case of the sample mixed for 5 minutes and 43% for the sample mixed for 2 hours. Thus, the use of high temperatures is not practical because the crystallinity of the polymer reaches more than 33% in a very short time. This means that a very short time is available for coloring the polyester.

Polyethylene terephthalate chips that were colored according to the process of this invention at 110° C. for 40 minutes were put into containers and vibrated in an attempt to simulate shipping conditions. In comparison, polyethylene terephthalate chips that were colored at 150° C. for two hours and the crystalline poyethylene terephthalate that was kept at 240° C. for 24 hours and then colored were also treated in the same manner. An investigation of the containers revealed that the polyethylene terephthalate chips that were colored by the process of this invention had very little or no free coloring matter at the bottom of the container while the crystalline polyethylene terephthalate sample and the one colored at 150° C. for two hours both had large amounts of settled coloring matter in the bottom of the container. It becomes evident that the coloring of polyester resins by the process of this invention permits retention of the coloring matter during shipping and shaking whereas otherwise some of the coloring matter comes off and settles in the container.

In the process of this invention coloring of the resin is easily accomplished with the products having generally excellent light fastness, washing and dry cleaning resistances, and heat resistance.

The following examples further illustrate the invention.

EXAMPLE 1

Five hundred grams of polyethylene terephthalate chips with intrinsic viscosity of 0.62 were placed in a two liter one neck flask. Then 2.5 grams of finely powdered 1-cyclohexylamino anthraquinone was added. The flask was slowly rotated on a glycol bath. The polyester chips and dye were tumbled and mixed in the flask at a temperature of approximately 95° C. After 50 minutes of mixing, there was no dye on the walls of the flask and the operation resulted in the polyester chips having a deep shade of red color. Fabric made from these polyester chips possessed a deep shade of red color.

EXAMPLES 2 TO 10

In the following examples, the procedure of Example 1 was used to test various coloring materials. The following table summarizes the pertinent data:

| Example | Dye | Color of chips |
| --- | --- | --- |
| 2 | 1-methylamino 4-p-toluidino | Blue. |
| 3 | 1,4-p-toluidino 5-hydroxy anthraquinone. | Green. |
| 4 | 1-cyclohexylamino anthraquinone | Red. |
| 5 | 1-p-toluidino-6-hydroxy anthraquinone | Bluish violet. |
| 6 | 1,4-p-toluidino anthraquinone | Bluish green. |
| 7 | 1:1 mixture of 1,5-p-toluidino anthraquinone and 1,8-p-toluidino anthraquinone. | Violet. |
| 8 | Fluorol green | Green. |
| 9 | 1,5-dibenzoylamino anthraquinone | Yellow. |
| 10 | 1-o-hydroxybenzoylamino anthraquinone. | Do. |

EXAMPLE 11

A mixture in the ratio of 1:1 of dyed polyester chips from Example 5 and Example 9 was spun into fibers having a green color.

EXAMPLE 12

Following the same procedure given in Example 1, 500 grams of a 90/10 polyethylene tere-isophthalate resin and 2.5 grams of 1-cyclohexylamino anthraquinone was mixed at 140° C. for 10 minutes. A deep shade of red color was obtained in fibers made from the resin.

EXAMPLE 13

Following the procedure of Example 1, 500 grams of 90/10 polyethylene tere-isophthalate and 2.5 grams of 1-methylamino 4-p-toluidino anthraquinone dye was mixed at 80° C. for 50 minutes. Fibers made from the resin had a deep shade of blue color.

The concentration of coloring matter used may be 0.001% to 1% by weight based on the polyester. Normally the preferred concentration is 0.1% to 0.5% by weight of coloring matter based on the polyester. Concentrations less than that indicated do not result in as bright a color while concentrations in excess of that indicated results in unabsorbed coloring matter or waste.

The thus treated polyester resins can be used to produce colored fibers, filaments, staples, films, cords or molded goods which possess excellent dry cleaning and washing resistance as well as a deep shade of color that is homogeneous throughout the polymer.

The invention has been illustrated particularly with respect to poly(ethylene terephthalate). It can be used with other crystallizable polyesters or copolyesters and including polyethylene(terephthalate - p - hydroxy - ethoxy benzoate) which is prepared from copolymerization of p-hydroxyethoxy benzoic acid and bis 2-hydroxy ethyl terephthalate. Representative examples of such polyesters are polyesters derived from dicarboxylic acids or ester forming derivatives thereof and glycols, for example, poly(tetramethylene terephthalate), poly(cyclohexylene dimethylene terephthalate), poly(ethylene dibenzoate), poly(ethylene-2,6-naphthalate), crystallizable copolyesters such as the crystallizable copolyesters of 90/10 ethylene terephthalate/ethylene isophthalate copolyesters, ethylene terephthalate-neopentyl terephthalate copolyesters, ethylene terephthalate-2,2 bis [4(beta hydroxy ethoxy phenyl)propane] terephthalate copolyesters, tetramethylene terephthalate-tetramethylene isophthalate copolyesters, ethylene terephthalate-ethylene-2,6 naphthalate copolyesters, ethylene terephthalate-ethylene adipate copolyesters and ethylene terephthalate-ethylene sebacate copolyesters.

While certain representative embodiments and details have been shown for the purpose of illustrating the invention, it will be apparent to those skilled in this art that various changes and modifications may be made therein without departing from the spirit or scope of the invention.

What is claimed is:

1. A process for the production of colored polyester resin having an intrinsic viscosity of at least 0.3 which comprises treating solid polyester resin containing less than about 33% crystalline structure with a thermally stable, soluble coloring matter by contacting polyester resin in solid state with solid coloring matter at a temperature between tthe glass transition temperature and the crystallization temperature of the polyester resin for a period of time sufficient for the resin to absorb the desired amount of coloring matter but less than that required to increase the crystalline structure to more than 33%.

2. A process according to claim 1 wherein the polyester resin is polyethylene terephthalate.

3. The process of claim 2 in which the polyethylene terephthalate is in the form of particles and has a density of less than about 1.374 and the particles are mixed with the coloring matter at a temperature between the glass transition temperature of the polyester and that temperature at which the density of the resin does not exceed 1.374 in a period for ten half times.

4. A process according to claim 1 wherein the polyester resin is an ethylene terephthalate-ethylene isophthalate copolyester containing at least 90% ethylene terephthalate units.

5. A process according to claim 3 wherein the temperature is controlled between 70 to 130° C.

6. The process of claim 3 wherein the coloring matter used is an anthraquinone dye free of water solubilizing substituents.

7. The process of claim 3 wherein the coloring matter used is 1,4-cyclohexylamino anthraquinone.

8. The process of claim 3 wherein the coloring matter used is 1-cyclohexylamino anthraquinone.

9. The process of claim 3 wherein the coloring matter used is 1-methylamino-4-$\beta$-hydroxy ethylamino anthraquinone.

10. The process of claim 3 wherein the coloring matter used is 1-methyl-4-p-toluidino anthraquinone.

11. The process of claim 3 wherein the coloring matter used is 1,4-p-toluidino-5-hydroxy anthraquinone.

12. The process according to claim 3 wherein the temperature is controlled between 85° C. to 110° C.

References Cited

UNITED STATES PATENTS 2,571,319   10/1951   Waters et al. _____ 260—40

OTHER REFERENCES

Vickerstaff: Physical Chemistry of Dyeing; Oliver & Boyd, London (1950); pp. 6 and 331 relied upon.

MORRIS LIEBMAN, Primary Examiner

S. M. PERSON, Assistant Examiner